United States Patent [19]

Ohtsubo et al.

[11] 4,389,108
[45] Jun. 21, 1983

[54] POWER SUPPLY CONTROL CIRCUIT IN A CAMERA

[75] Inventors: Yoshiaki Ohtsubo, Kawasaki; Sakuji Watanabe, Warabi; Ryuzo Motoori, Kawasaki, all of Japan

[73] Assignee: Nippon Kogaku K.K., Tokyo, Japan

[21] Appl. No.: 359,031

[22] Filed: Mar. 17, 1982

Related U.S. Application Data

[63] Continuation of Ser. No. 268,684, Jun. 1, 1981, abandoned, which is a continuation of Ser. No. 73,422, Sep. 7, 1979, abandoned.

[30] Foreign Application Priority Data

Sep. 14, 1978 [JP] Japan .................................. 53/113015

[51] Int. Cl.³ ............................................ G03B 7/083
[52] U.S. Cl. .................... 354/50; 354/60 R; 354/266
[58] Field of Search ................... 354/60 R, 266, 267, 354/50, 51

[56] References Cited

U.S. PATENT DOCUMENTS

| | | | |
|---|---|---|---|
| 4,003,063 | 1/1977 | Takahashi et al. | 354/267 X |
| 4,161,355 | 7/1979 | Sahara et al. | 354/267 X |
| 4,182,557 | 1/1980 | Date et al. | 354/266 X |

*Primary Examiner*—Michael L. Gellner
*Attorney, Agent, or Firm*—Fitzpatrick, Cella, Harper & Scinto

[57] ABSTRACT

In a camera having a capacitor connected between DC power source lines and at least one electrical circuit connected between the power source lines, each of the electrical circuits including a semiconductor switch element in the current route between the power source lines for interrupting the current flowing through the circuit, a device for controlling the power supply to each of the electrical circuits includes main switch means provided between the power source lines for applying a bias current to the semiconductor element.

2 Claims, 1 Drawing Figure

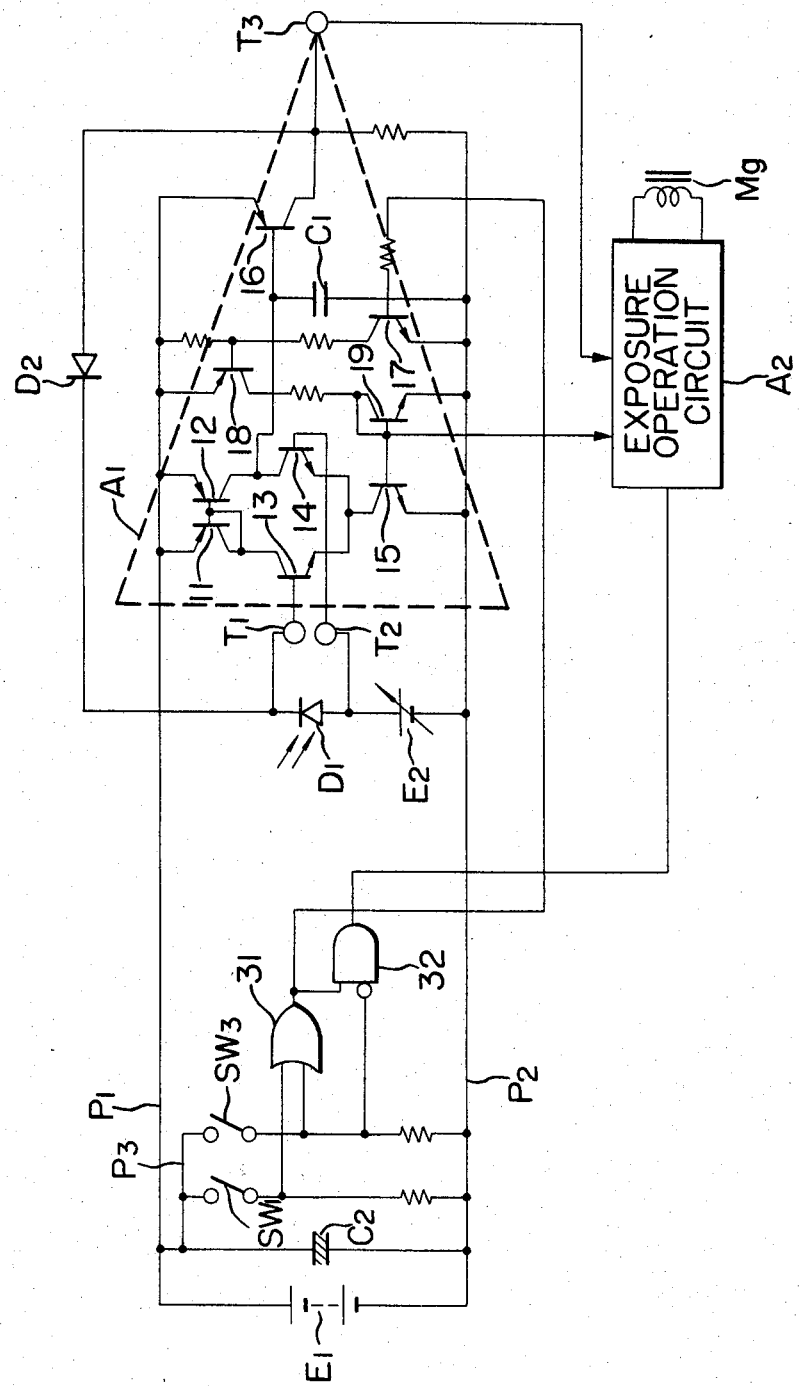

POWER SUPPLY CONTROL CIRCUIT IN A CAMERA

This is a continuation of application Ser. No. 268,684, filed June 1, 1981, now abandoned, which is a continuation of Ser. No. 73,422, filed Sept. 7, 1979, abandoned.

BACKGROUND OF THE INVENTION

1. Field of the Invention

This invention relates to a device for controlling the power supply to an electrical circuit such as the exposure control circuit of a camera.

2. Description of the Prior Art

In cameras having an exposure control circuit such as an electric shutter or the like, a capacitor has been parallel-connected to a power supply battery to reduce the output impedance of the battery. Also, capacitors for preventing oscillation have been used in many of the exposure control circuits. As the result, during the closing of the main switch, the circuit operation is unstable before the charging of these capacitors has been completed. Therefore, for example, in a single lens reflex camera wherein the power source switch of the exposure control circuit is closed in the course of the depression of a shutter release button and shutter release is started at the extremity of the depression, if the release button has been momentarily depressed to its extremity, shutter relase is started before the operation of the exposure control circuit becomes stable and as the result, there is an undesirable possibility that exposure control is not effected accurately.

SUMMARY OF THE INVENTION

It is an object of the present invention to provide a power supply control circuit for improving the response characteristic of the exposure control device or the like of a camera during the closing of the main switch.

The invention will become fully apparent from the following detailed description thereof taken in conjunction with the accompanying drawing.

BRIEF DESCRIPTION OF THE DRAWING

The drawing is a circuit diagram showing an embodiment of the power supply control circuit according to the present invention.

DESCRIPTION OF THE PREFERRED EMBODIMENTS

The invention will hereinafter be described with reference to the drawing. The drawing is a circuit diagram showing an embodiment of the present invention. Not all the circuit arrangement of the exposure control circuit is shown but the metering circuit is representatively shown. In the drawing, the power source lines $P_1$ and $P_2$ of a metering amplifier $A_1$ are directly connected to the electrode of a power supply battery $E_1$. The metering amplifier $A_1$ (the so-called operational amplifier) is constructed as will hereinafter be described. Transistors 11, 12 forming a current mirror circuit, a transistor 13 having an input terminal $T_1$, a transistor 14 having an input terminal $T_2$, and a transistor 15 acting as a constant current source together constitute a differential amplifier circuit. A transistor 16 finally amplifies the output of the transistor 14 amplified by a plurality of stages of amplifiers, not shown, namely, the differential output. The output of the transistor 16 is taken out as the output of the metering amplifier from an output terminal $T_3$. Transistors 17 and 18 act as a switch for switching a transistor 19 which generates a bias current. The bias voltage put out by the transistor 19, namely, the base voltage, provides the base voltage of the transistor 15 and determines the corrector current of the transistor 15. The base voltage of the transistor 19 is used as the bias voltage of other circuit such as an exposure operation circuit $A_2$ or the like. A capacitor $C_1$ is for preventing oscillation. What has been described above constitutes a metering amplifier $A_1$ which is an operational amplifier.

A photodiode $D_1$ for measuring the brightness of an object is connected between the input terminals $T_1$ and $T_2$ of the metering amplifier $A_1$, and a log diode $D_2$ for logarithmically compressing the output of the photodiode $D_1$ is connected to the negative feedback loop between the output terminal $T_3$ and the input terminal $T_1$. A power source $E_2$ is the biasing power source for the photodiode $D_1$. The metering amplifier $A_1$ and the diodes $D_1$ and $D_2$ together constitute a metering circuit as is well-known.

An electrolytic condenser $C_2$ for preventing a high output impedance caused by the internal resistance of the battery, a main switch $SW_1$ adapted to be closed in the course of the depression stroke of the camera's release button (not shown), and a switch $SW_2$ adapted to be closed in response to a mirror driving mechanism or the like during upward movement of a camera's mirror are connected between power source lines $P_2$ and $P_3$. An OR gate 31 receives as input the ON-OFF signals of the switches $SW_1$ and $SW_2$ and the output thereof is applied to the transistor 17. An AND gate 32 receives as input the output of the OR gate 31 and the ON-OFF signal of the switch $SW_2$ and the output thereof is applied to the circuit $A_2$.

The exposure operation circuit $A_2$ receives as input signals the output of the metering amplifier $A_1$ and the output of the AND gate 32, and also receives the bias current of the transistor 19 as the current signal for controlling the circuit operation. The circuit operating condition due to the presence or absence of the bias voltage is representatively described with respect to the metering amplifier $A_1$ and therefore, no specific circuit arrangement is shown.

Operation will now be described. As shown in the drawing, when the switches $SW_1$ and $SW_2$ are opened, the electrolytic condenser $C_2$ has been charged up. Also, the OR gate 31 is putting out a L-level output (substantially the potential of the power source line $P_2$), so that the transistors 17 and 18 are turned off. Thus, there is no current flowing into the transistor 19 and so, the base voltage generated by this transistor 19 becomes zero and the transistors 11-14 and 16 become turned off. As the result, the output terminal $T_3$ of the metering amplifier $A_1$ assumes L-level. At this time, the transistor 16 is in OFF-condition, but the oscillation preventing capacitor $C_1$ is being charged through the diode between the emitter and base of the transistor 16. This condition is the inoperative condition of the metering amplifier $A_1$. The exposure operation circuit $A_2$ is likewise in its inoperative condition.

Now, when the release button is depressed to close (trigger) the main switch $SW_1$, one input of the OR gate 31 assumes H-level (substantially the potential of the power source line $P_1$) and so, the output thereof assumes H-level and the transistors 17 and 18 become turned on, and the transistor 19 puts out a bias voltage.

As the result, the transistors 11–14 and 16 become conductive (operative), and a voltage corresponding to the logarithm of the output of the photodiode $D_1$ is obtained at the output terminal $T_3$ of the metering amplifier $A_1$. By this time, the capacitors $C_1$ and $C_2$ have already been charged up and therefore, the above-described operation is achieved as soon as the switch $SW_1$ is closed. Accordingly, the response delay of the metering amplifier $A_1$ during the rising thereof is improved.

Next, when the release button is depressed to its extremity, the shutter release of the camera takes place and the mirror moves upwardly, whereupon the switch $SW_2$ is closed so that the output of the AND gate 32 assumes H-level. The exposure operation circuit $A_2$ having received the output of the AND gate 32 stores the output of the metering amplifier $A_1$ and in accordance with the stored value, it controls electromagnetic means Mg to thereby control the shutter speed, for example. Even if the switch $SW_1$ is opened by the gates 31 and 32 with the release button returned to its initial position after the shutter release and before completion of the exposure, the switch $SW_2$ remains closed in response to the mirror until the exposure is completed, so that the exposure operation circuit $A_2$ continues to operate.

According to the above-described embodiment, the current routes of the transistors 15–18 between the power source lines $P_1$ and $P_2$ are interrupted when the bias current is cut off by the transistors 15–18 acting as a switching element and therefore, the current consumed is not increased and in addition, the electrolytic condenser $C_2$ is charged at all times and the capacitor $C_1$ is charged during the closing of the main switch and thus, the response delay during the closing of the main switch is improved.

According to the present invention, as described above, there is provided an exposure control circuit in a camera wherein the response delay during the closing of the main switch is improved.

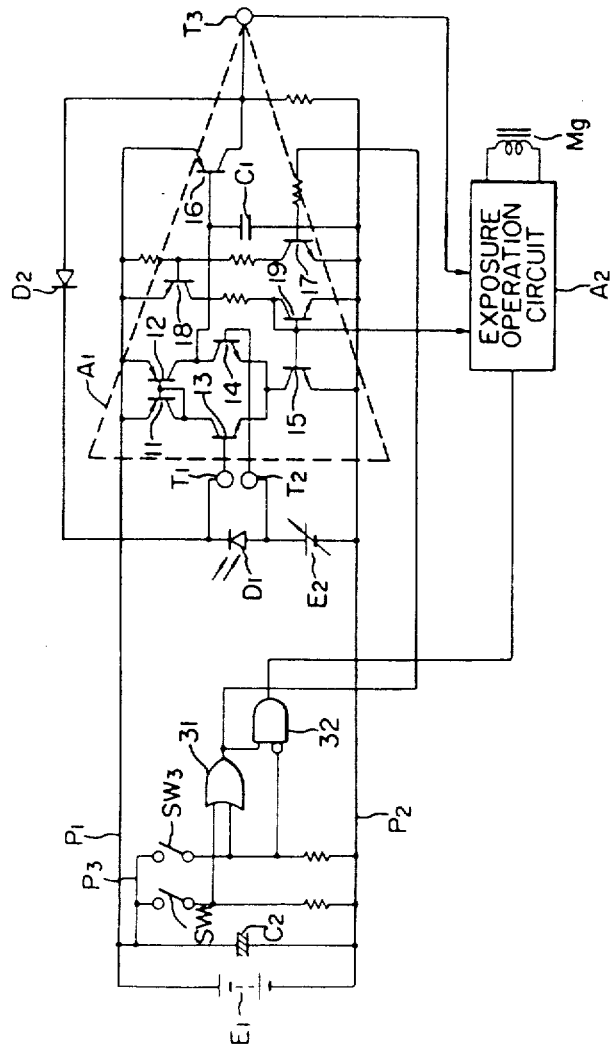

We claim:

1. In a camera having a light metering circuit including a light receiving element for receiving light from the object to be photographed and a circuit for amplifying output from the light receiving element, said amplifying circuit including a differential amplifier and capacitor means for preventing oscillation of said differential amplifier; means for controlling exposure based on the output from the metering circuit; first switch means actuated at a first step of a shutter release operation to permit power to flow from a source to the metering circuit; and second switch means actuated at a second step of the shutter release operation following said first step to trigger said exposure control means; the improvement wherein said amplifying circuit further comprises:

means for connecting said capacitor means across said source; and third switch means operatively associated with said first switch means for controlling operation of said differential amplifier.

2. An improvement as set forth in claim 1, wherein said means connecting said capacitor means across said source comprises a transistor having a base and an emitter connected to one terminal of said source and said capacitor means, respectively.

* * * * *

UNITED STATES PATENT AND TRADEMARK OFFICE
CERTIFICATE OF CORRECTION

PATENT NO. : 4,389,108

DATED : June 21, 1983

INVENTOR(S) : Yoshiaki Ohtsubo et al.

It is certified that error appears in the above-identified patent and that said Letters Patent is hereby corrected as shown below:

The title page showing the illustrative figure should be deleted to appear as per attached title page.

Signed and Sealed this

Thirtieth Day of August 1983

[SEAL]

Attest:

*Attesting Officer*

GERALD J. MOSSINGHOFF

*Commissioner of Patents and Trademarks*

United States Patent
Ohtsubo et al.

[11] 4,389,108
[45] Jun. 21, 1983

[54] POWER SUPPLY CONTROL CIRCUIT IN A CAMERA

[75] Inventors: Yoshiaki Ohtsubo, Kawasaki; Sakuji Watanabe, Warabi; Ryuzo Motoori, Kawasaki, all of Japan

[73] Assignee: Nippon Kogaku K.K., Tokyo, Japan

[21] Appl. No.: 359,031

[22] Filed: Mar. 17, 1982

Related U.S. Application Data

[63] Continuation of Ser. No. 268,684, Jun. 1, 1981, abandoned, which is a continuation of Ser. No. 73,422, Sep. 7, 1979, abandoned.

[30] Foreign Application Priority Data

Sep. 14, 1978 [JP] Japan ............... 53/113015

[51] Int. Cl.³ ............................... G03B 7/083
[52] U.S. Cl. .................. 354/50; 354/60 R; 354/266
[58] Field of Search .............. 354/60 R, 266, 267, 354/50, 51

[56] References Cited

U.S. PATENT DOCUMENTS

| | | | |
|---|---|---|---|
| 4,003,063 | 1/1977 | Takahashi et al. | 354/267 X |
| 4,161,355 | 7/1979 | Sahara et al. | 354/267 X |
| 4,182,557 | 1/1980 | Date et al. | 354/266 X |

*Primary Examiner*—Michael L. Gellner
*Attorney, Agent, or Firm*—Fitzpatrick, Cella, Harper & Scinto

[57] ABSTRACT

In a camera having a capacitor connected between DC power source lines and at least one electrical circuit connected between the power source lines, each of the electrical circuits including a semiconductor switch element in the current route between the power source lines for interrupting the current flowing through the circuit, a device for controlling the power supply to each of the electrical circuits includes main switch means provided between the power source lines for applying a bias current to the semiconductor element.

2 Claims, 1 Drawing Figure